US008865856B2

(12) United States Patent
Fujii et al.

(10) Patent No.: US 8,865,856 B2
(45) Date of Patent: Oct. 21, 2014

(54) TONER RESINS FOR ELECTRONIC COPYING PURPOSES

(75) Inventors: Yoshihisa Fujii, London (GB); Hiroyasu Kanno, Tokyo (JP); Torii Yoshinori, Kamakura (JP); Ema Kenji, Yokohama (JP)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/383,278

(22) PCT Filed: Jul. 6, 2010

(86) PCT No.: PCT/EP2010/059625
§ 371 (c)(1), (2), (4) Date: Jan. 10, 2012

(87) PCT Pub. No.: WO2011/003898
PCT Pub. Date: Jan. 13, 2011

(65) Prior Publication Data

US 2012/0251941 A1 Oct. 4, 2012

(30) Foreign Application Priority Data

Jul. 10, 2009 (EP) .................................... 09165212

(51) Int. Cl.
*C08G 64/00* (2006.01)
*G03G 9/087* (2006.01)
*C08G 18/44* (2006.01)
*C08G 64/30* (2006.01)
*C08G 64/02* (2006.01)
*C08G 63/02* (2006.01)

(52) U.S. Cl.
CPC ........ *C08G 64/0216* (2013.01); *G03G 9/08755* (2013.01); *G03G 9/08795* (2013.01); *C08G 18/44* (2013.01); *G03G 9/08757* (2013.01); *C08G 64/305* (2013.01); *G03G 9/08797* (2013.01)
USPC ......................... 528/196; 430/111.4; 528/198

(58) Field of Classification Search
USPC ................................ 528/196, 198; 430/111.4
See application file for complete search history.

(56) References Cited

U.S. PATENT DOCUMENTS 3,544,524 A 12/1970 Mueller et al.
3,689,461 A 9/1972 Balint et al.
3,893,935 A 7/1975 Jadwin et al.
4,079,014 A 3/1978 Burness et al.
4,323,634 A 4/1982 Jadwin
4,394,430 A 7/1983 Jadwin et al.
4,990,578 A 2/1991 Greco et al.
6,610,454 B2 * 8/2003 Hashimoto et al. ........ 430/109.2
8,410,227 B2 4/2013 Eipper et al.
2009/0030140 A1 1/2009 Eipper et al.
2009/0092917 A1 4/2009 Sugimoto et al.
2009/0257960 A1 * 10/2009 Kim et al. ....................... 424/47
2010/0063204 A1 * 3/2010 Hamasaki et al. ............ 524/599
2011/0034616 A1 * 2/2011 Noordover et al. ........... 524/507
2012/0232212 A1 9/2012 Eipper et al.

FOREIGN PATENT DOCUMENTS

| | | | |
|---|---|---|---|
| CN | 101029127 | A | 9/2007 |
| GB | 1 420 839 | | 1/1976 |
| GB | 1 501 065 | | 2/1978 |
| JP | 4 211272 | | 8/1992 |
| JP | 11 305481 | | 11/1999 |
| JP | 2007-520608 | A | 7/2007 |

OTHER PUBLICATIONS

Von Werner Siefken, "Mono- und Polyisocyanate IV. Mitteilung über Polyurethane*)," Justus Liebigs Annalen Der Chemie, vol. 562, pp. 75-136, (1949).
International Search Report Issued Aug. 11, 2010 in PCT/EP10/59625 Filed Jul. 6, 2010.
Office Action issued Nov. 18, 2013 in Japanese Patent Application No. 2012-518965 (submitting English language translation only).
First Office Action issued Feb. 18, 2013 in Chinese Patent Application No. 201080039961.3 (submitting English language translation only).
Second Office Action issued Oct. 21, 2013 in Chinese Patent Application No. 201080039961.3 (submitting English language translation only).

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A polycarbonate of number average molecular weight from 500 to 10000, glass transition point from 30 to 80° C. and hydroxyl group value of 30 mg KOH/g or less. The use of the polycarbonate in a urethane modified resin used as an ingredient for the production of a toner or a developer. A urethane modified resin obtained by reacting a polymer mixture containing the polycarbonate and a polycondensed resin of glass transition point from 10 to 60° C. and hydroxyl group value from 20 to 100 mg KOH/g with a polyfunctional isocyanate compound wherein the ratio of polycarbonate to polycondensed resin is from 20:80 to 80:20 by weight and the molar ratio of isocyanate groups in the polyisocyanate compound to hydroxyl groups in the polymer mixture is from 0.4 to 1.2:1. A toner for electronic copying containing the urethane modified polycarbonate based resin. A developer containing the toner and optionally a carrier.

20 Claims, No Drawings

TONER RESINS FOR ELECTRONIC COPYING PURPOSES

The invention relates to a polycarbonate used as an ingredient for a urethane modified resin, a urethane modified resin for use in a toner or a developer for electronic copying purposes, a toner as well as a developer comprising said urethane modified resin. The present invention also relates to a method of manufacturing a urethane modified resin, toners and developers comprising said resin.

Toner resins for electronic copying purposes which have superior low temperature fixing properties are required in view of the increased speed of the latest generation of copying machines. Modern toner resins should also enable operation at a low working temperature to promote energy savings. It is therefore necessary that the glass transition point of the toner is reduced so that the toner is fixable at low temperatures ("low temperature fixability"). To achieve these effects, toner resins comprising polyester resins are generally being described in the patent literature, e.g. in US-A-2009092917. Urethane modified polyester resins where a diisocyanate has been reacted with a mixture of polyester resin of high molecular weight and polyester resin of low molecular weight have been suggested in Japanese Unexamined Patent Application Laid Open H4-211272 or Japanese Unexamined Patent Application Laid Open H11-305481.

However, toners in which polyester resins are being used have the disadvantage that although providing excellent low temperature fixing properties, the storage properties are inadequate. In particular, toner storage properties are essential not only in respect to heat generated during the operation of the copying machines but also during shipping, during which the toner can be exposed to elevated temperatures, e.g. when a transport container is exposed to direct sunlight.

The object of the present invention was to improve the weaknesses of conventional toners based on polyester resins in respect to providing excellent low temperature fixing properties while at the same time providing for improved stability during storage. The object of the present invention was solved with a polycarbonate of number average molecular weight from 500 to 10000 g/mol, glass transition point from 30 to 80° C. and hydroxyl group value of 30 mg KOH/g or less and using said polycarbonate in a urethane modified resin obtainable by the reaction of a polymer mixture comprising said polycarbonate and a polycondensed resin of glass transition point from 10 to 60° C. and hydroxyl group value from 20 to 100 mg KOH/g with a polyfunctional isocyanate compound wherein the ratio of polycarbonate and polycondensed resin is from 20:80 to 80:20 by weight and the molar ratio of isocyanate groups in the polyisocyanate compound to hydroxyl groups in the polymer mixture is between 0.4 to 1.2:1.

A toner or developer for electronic copying purposes in which a urethane modified polycarbonate based resin according to this invention is being used is excellent in terms of both its low temperature fixing properties and its storage properties.

The polycarbonate which is used in the invention can be produced by means of a polycondensation reaction involving at least one type of polyhydric alcohol compound, a carbonate compound and an end-blocking agent. In such a reaction a polycarbonate is generally formed by the reaction of said compounds under the elimination of a low molecular weight by-product, such as an alcohol or HCl. Such reactions are well-known and described for example in U.S. Pat. No. 3,689,461.

The carbonate compound used in the production of the polycarbonate is usually a low molecular weight compound, such as phosgene, a chloroformate, alkylene carbonate, dialkyl carbonate or diaryl carbonate Examples of alkylene carbonates include ethylene carbonate, propylene carbonate, 1,2-butylene carbonate, 1,3-butylene carbonate, 2,3-butylene carbonate, 1,2-pentylene carbonate, 1,3-pentylene carbonate, 1,4-pentylene carbonate, 1,5-pentylene carbonate, 2,3-pentylene carbonate and 2,4-pentylene carbonate and the like.

Examples of dialkyl carbonates include symmetrical dialkyl carbonates, such as dimethyl carbonate, diethyl carbonate, di-n-propyl carbonate, di-iso-propyl carbonate, di-n-butyl carbonate, di-iso-butyl carbonate and the like as well as unsymmetrical dialkyl carbonates, such as methyl ethyl carbonate, methyl propyl carbonate, methyl butyl carbonate, ethyl propyl carbonate, ethyl butyl carbonate and the like.

Examples of aryl carbonates include symmetrical diaryl carbonates, such as diphenyl carbonate, dinaphthyl carbonate and the like as well as asymmetrical diaryl carbonates, such as phenyl naphthyl carbonate and the like.

The above-mentioned carbonate compounds may be used alone or in mixtures of different carbonate compounds.

Preferred carbonate compounds are alkylene carbonates, especially ethylene carbonate, propylene carbonate and butylene carbonates, dialkyl carbonates, especially dimethyl carbonate, diethyl carbonate, dibutyl carbonate and methyl ethyl carbonate, and aryl carbonates, especially diphenyl carbonate, dinaphthyl carbonate and phenyl naphthyl carbonate. Especially preferred carbonate compounds are ethylene carbonate, propylene carbonate, dimethyl carbonate, diethyl carbonate, dibutyl carbonate and methyl ethyl carbonate.

Polyhydric alcohols which are used in the production of the polycarbonate are usually polyhydric alcohols having a number average molecular weight between 50 and 1000 g/mol. The polyhydric alcohols can have 2 or more hydroxyl groups per molecule. Preferably dihydric or trihydric alcohols are used in the present invention.

Examples of dihydric alcohols are ethylene glycol, 1,2-propanediol, 1,3-propanediol, 1,2 butanediol, 1,3-butanediol, 1,4-butanediol, 1,4-pentanediol, 1,5-pentanediol, 1,6 hexanediol, 2,3-hexanediol, 3,4-hexanediol, neopentyl glycol, diethylene glycol, triethylene glycol, dipropylene glycol, hydrogenated bisphenol A, bisphenol A ethylene oxide adduct, bisphenol A propylene oxide adduct and the like.

Examples of trihydric and higher polyhydric alcohols are glycerol, triglycerol, tetraglycerol, pentaerythrite, trimethylolpropane, erythrit, mannitol, sorbitol and the like.

Preferred dihydric alcohols are ethylene glycol, 1,2-propanediol, 1,3-propanediol, 1,2 butanediol, 1,3-butanediol, 1,4-butanediol, 1,4-pentanediol, 1,5-pentanediol, 1,6 hexanediol, bisphenol A ethylene oxide adduct and bisphenol A propylene oxide adduct. Especially preferred dihydric alcohols are 1,4-butanediol, 1,6 hexanediol, bisphenol A ethylene oxide adduct and bisphenol A propylene oxide adduct.

Preferred trihydric and polyhydric alcohols are glycerine, diglycerine and trimethylol-propane.

Furthermore an end-blocking agent is used for the production of the polycarbonate. The end-blocking agent has the function of controlling the molecular weight and to suppress as far as possible the urethanization reaction in which the polycarbonate of the invention is to be used. Hence any of the known compounds which have the function of reacting with a low molecular weight carbonate compound and forming a new carbonate group and which, after reaction, does not react with isocyanate compounds at temperatures from normal temperature to about 150° C. can be used as an end-blocking agent. Preferably monohydric aliphatic alcohols, monohydric alicyclic alcohols and monohydric aromatic alcohols which have boiling points above about 120° C. can be used as end-blocking agents.

Preferred examples for end blocking agents include 1-hexanol, 1-pentanol, 1-octanol, cyclohexanol, cyclopentanol, cyclooctanol, methacrylol and 3,5 xylenol and p-t-butylphenol.

The end blocking agent can be introduced together with the other raw materials, during the course of the reaction or at the end of the reaction. Since a part of the end-blocking agent may be distilled off from the reaction mixture during the course of the polycondensation reaction it may be necessary to add additional end blocking agent during the reaction or to add an excess of end blocking agent at the beginning of the reaction.

The total amount of end blocking agent added during the reaction should yield a polycarbonate having a hydroxyl value of 30 mg KOH/g or less, preferably 10 mg KOH/g or less.

The polycondensation reaction for the production of the polycarbonate can proceed uncatalyzed or with the aid of a catalyst.

Carbonates, carboxylates, borates, silicates, carbonates, oxides and organometallic compounds of alkali metals, alkaline earth metals, zinc, titanium, lead, and preferably organotitanium compounds such as tetra-n-butyltitanate [Ti$(C_4H_9O)_4$], tetrapropyltitanate [$Ti(C_3H_7O)_4$], tetrastearyltitanate [$Ti(C_{18}H_{37}O)_4$], can be used as catalysts.

The amount of catalyst used is preferably from 0.001 to 1%, and especially from 0.05 to 0.2% by weight the starting raw material.

The polycondensation is usually conducted at atmospheric pressure to sub atmospheric pressure, preferably from 1 mbar to 1 bar and more preferably from 10 mbar to 500 mbar.

The reaction temperature is usually from 70 to 250° C., and preferably from 80 to 220° C. The polycondensation reaction is usually conducted in a stirred tank reactor equipped with a distillation column.

A preferable embodiment for the production of the polycarbonate involves introducing the raw materials, namely the carbonate compound, the polyhydric alcohol, the end blocking agent and catalyst in one shot into a reactor, gradually raising the temperature to from 100 to 180° C. in a nitrogen atmosphere and bringing about a reaction with the elimination of a hydroxyl group containing compound (of low molecular weight), which is usually removed from the reaction mixture by distillation. The latter half of the reaction is preferably carried out under a reduced pressure from 1 mbar to 150 mbar and a reaction temperature from 200 to 250° C.

The polycarbonate according to the invention has a hydroxyl group value of 30 mg KOH/g or less, preferably 10 mg KOH/g or less. Preferably the hydroxyl group value is in the range of 1 to 30 mg KOH/g, more preferably in the range of 1 to 10 mg KOH/g. If the polycarbonate has a hydroxyl group value of 30 mg KOH/g or less, preferably 10 mg KOH/g or less, it is believed that that the molecular weight build-up caused by the reaction of the polycarbonate with polyisocyanates in a subsequent urethanization reaction is limited, so that the polycarbonate retains its low molecular weight and thus contributes to improved low temperature fixing properties. It is further believed that if the molecular weight build-up caused by the reaction of the polycarbonate and polyisocyanate becomes too high, the low temperature fixing properties become poor. Moreover it is believed that if the hydroxyl group value is 30 mg KOH/g or less, preferably 10 mg KOH/g or less, the storage properties are improved because the hygroscopic nature of the polycarbonate is reduced due to the relatively low number of hydroxyl end groups present in the polycarbonate.

The polycarbonate of the invention has a glass transition point within the range from 30 to 80° C., preferably from 40 to 70° C. The glass transition point of the polycarbonate is measured with differential scanning calorimety (DSC) at a heating rate of 10° C./min. Before the glass transition point is determined the polycarbonate is usually heated well above the glass transition point in a first run and then cooled down well below the glass transition point at the same rate of 10° C./min.

The number average molecular weight of the polycarbonate of the invention is in the range of 500 to 10000 g/mol, preferably from 800 to 5000 g/mol.

A polycarbonate having a hydroxyl group number, a glass transition and a molecular weight as specified above has excellent low temperature fixing properties and exhibits high storage stability in a toner for electronic copying purposes.

The polycarbonate according to the invention is used for the production of a urethane modified resin, which is used as an ingredient for the production of a toner and/or a developer.

The urethane modified resin is obtainable by the reaction of a polymer mixture comprising a polycarbonate according to the invention and a polycondensed resin of glass transition point from 10 to 60° C. and hydroxyl group value from 20 to 100 mg KOH/g with a polyfunctional isocyanate compound.

The polymer mixture used for the production of the urethane modified resin comprises a polycarbonate according to the invention and a polycondensed resin.

The polycondensed resin can be a known polyester resin, polycarbonate resin, polyamide resin, polyester/polyamide co-condensed resin, polyester/polycarbonate co-condensed resin or the like. The polycondensed resin may also be a mixture of one or more of the resins mentioned-above.

The polycondensed resin is preferably a polycarbonate resin, a polyester resin or a polyester/polycarbonate co-condensed resin.

Polycarbonate resins can be obtained by the method using carbonate compounds, polyhydric compounds and optionally end blocking agents described above.

Preferred carbonate compounds are alkylene carbonates, especially ethylene carbonate, propylene carbonate and butylene carbonates, dialkyl carbonates, especially dimethyl carbonate, diethyl carbonate, dibutyl carbonate and methyl ethyl carbonate, and aryl carbonates, especially diphenyl carbonate, dinaphthyl carbonate and phenyl naphthyl carbonate. Especially preferred carbonate compounds are ethylene carbonate, propylene carbonate, dimethyl carbonate, diethyl carbonate, dibutyl carbonate and methyl ethyl carbonate.

Preferred polyhydric compounds are ethylene glycol, 1,2-propanediol, 1,3-propanediol, 1,2 butanediol, 1,3-butanediol, 1,4-butanediol, 1,4-pentanediol, 1,5-pentanediol, 1,6 hexanediol, glycerine, diglycerine and trimethylolpropane. Especially preferred polyhydric alcohols are 1,4-butanediol, 1,6 hexanediol bisphenol A ethylene oxide adduct and bisphenol A propylene oxide adduct.

Polyester resins can be obtained by means of the usual polycondensation of polyhydric alcohols and polycarboxylic acids.

The polyhydric alcohols can be the same as those described above for the production of polycarbonate.

Polycarboxylic acids are preferably dibasic acids, in particularly aliphatic dibasic acids, such as malonic acid, succinic acid, glutamic acid, adipic acid, azelaic acid, sebacic acid, hexahydrophthalic anhydride and the like, aliphatic unsaturated dibasic acids such as maleic acid, maleic anhydride, fumaric acid, itaconic acid, citraconic acid and the like, and aromatic dibasic acids such as phthalic anhydride, phthalic acid, terephthalic acid, isophthalic acid and the like.

The term dibasic acid also comprises the lower alkyl esters of these acids, especially the methyl, ethyl, propyl and butyl esters of the carboxylic acids mentioned above. Polycarboxylic acid can also be carboxylic acids having 3 or more carboxylic groups, such as trimellitic acid.

Preferred polyhydric compounds for the production of polyester resins are ethylene glycol, 1,2-propanediol, 1,3-propanediol, 1,2 butanediol, 1,3-butanediol, 1,4-butanediol, 1,4-pentanediol, 1,5-pentanediol, 1,6 hexanediol, glycerine, diglycerine and trimethylol-propane. Especially preferred polyhydric compounds for the production of polyester resins are 1,4-butanediol, 1,6 hexanediol, bisphenol A ethylene oxide adduct and bisphenol A propylene oxide adduct.

Preferred carboxylic acids are oxalic acid, succinic acid, glutamic acid, adipic acid, azelaic acid, sebacic acid, phthalic anhydride, phthalic acid, terephthalic acid and isophthalic acid. Especially preferred are oxalic acid, succinic acid, glutamic acid and adipic acid.

Furthermore, catalysts such as tin-containing catalysts (for example dibutyltin oxide), antimony trioxide, titanium-containing catalysts and the like can be used, as required, Polyester resins are generally manufactured at a pressure from 1 mbar 1 bar, preferably 10 mbar to 500 mbar at a temperature of 150 to 300° C., preferably 200 to 250° C.

The acid number of the polyester is usually in the range from 0.1 to 50 mg KOH/g, preferably in the range of 1 to 40 mg KOH/g and more preferably in the range of 10 to 20 mg KOH/g.

Furthermore, the polyester/polycarbonate co-condensates can be obtained with a method in which a polycarbonate diol produced from a polyhydric alcohol and a low molecular weight carbonate compound which is then subjected to an esterification reaction using a polycarboxylic acid. Alternatively a polyester diol is produced from a polyhydric alcohol and a polycarboxlyic acid and then reacted with a low molecular weight carbonate compound. Preferred polycarbonate compounds are alkylene carbonates, especially ethylene carbonate, propylene carbonate and butylene carbonates, dialkyl carbonates, especially dimethyl carbonate, diethyl carbonate, dibutyl carbonate and methyl ethyl carbonate, and aryl carbonates, especially diphenyl carbonate, dinaphthyl carbonate and phenyl naphthyl carbonate, especially preferred carbonate compounds are ethylene carbonate, propylene carbonate, dimethyl carbonate, diethyl carbonate, dibutyl carbonate and methyl ethyl carbonate.

Preferred polyhydric alcohols are ethylene glycol, 1,2-propanediol, 1,3-propanediol, 1,2 butanediol, 1,3-butanediol, 1,4-butanediol, 1,4-pentanediol, 1,5-pentanediol, 1,6 hexanediol, glycerine, diglycerine,trimethylolpropane, bisphenol A ethylene oxide adduct and bisphenol A propylene oxide adduct and preferred polycarboxylic acids are succinic acid, glutamic acid, adipic acid, azelaic acid, sebacic acid, phthalic anhydride, phthalic acid, terephthalic acid and isophthalic acid. Especially preferred polyhydric alcohols are 1,4-butanediol, 1,6 hexanediol, bisphenol A ethylene oxide adduct and bisphenol A propylene oxide adduct.

The acid number of the polycarbonate/polyester co-condensates is usually in the range from 0.1 to 50 mg KOH/g, preferably in the range of 1 to 40 mg KOH/g and more preferably in the range of 10 to 20 mg KOH/g.

The glass transition point of the polycondensed resin is in the range of 10 to 60° C., preferably 20 to 50° C. The glass transition point of the polycondensed resin is measured with differential scanning calorimety (DSC) at a heating rate of 10° C./min. Before the glass transition point is determined the polycondensed resin is usually heated well above the glass transition point in a first run and then cooled down well below the glass transition point at the same rate.

The hydroxyl group value of the polycondensed resin is in the range from 20 to 100 mg KOH/g, preferably 30 to 90 mg KOH/g.

The ratio of the polycarbonate according to the invention and polycondensed resin in the polymer mixture is usually in the range of 20:80 to 80:20, and preferably from 30:70 to 70:30 by weight.

The polymer mixture is reacted with a polyfunctional isocyanate compound to yield a urethane modified resin.

The urethane modified resin is obtainable by the reaction of a polymer mixture comprising a polycarbonate according to the invention and a polycondensed resin of glass transition point from 10 to 60° C. and hydroxyl group value from 20 to 100 with a polyfunctional isocyanate compound.

The polyfunctional isocyanate compound can include aliphatic, cycloaliphatic, araliphatic, aromatic and heterocyclic polyisocyanates of the type described, for example, by W. Siefken in Annalen der Chemie, 562, pages 75 to 136.

Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (isophorone diisocyanate (IPDI)); 2,4- and 2,6-hexahydrotolylene diisocyanate and mixtures of these isomers, perhydro-2,4'-and/or 4,4'-diphenylmethane diisocyanate, 1,3- and 1,4-phenylene diisocyanate, 2,4- and 2,6-tolylene diisocyanate and mixtures of these isomers (TDI), diphenylmethane-2,4'- and/or 4,4'-diisocyanate (MDI), naphthylene-1,5-diisocyanate, triphenylmethane-4,4',4"-triisocyanate, polyphenylpolymethylene polyisocyanates of the type obtained by condensing aniline with formaldehyde, followed by phosgenation. In general, it is especially preferred to use the readily accessible polyisocyanates, such as 2,4- and 2,6-tolylene diisocyanate and mixtures of these isomers (TDI), polyphenyl-polymethylene polyisocyanates of the type obtained by condensing aniline with formaldehyde, followed by phosgenation, "crude" MDI and distilled or "pure" MDI.

All of these compounds are well known in the patent literature.

Preferred polyfunctional isocyanate compound include aliphatic diisocyanates, especially tetramethylene diisocyanate and hexamethylene diisocyanate;

alicyclic diisocyanates, especially isophorone diisocyanate (IPDI), norbornene diisocyanate and dicyclohexylmethane diisocyanate;

aromatic polyisocyanates, especially tolylene diisocyanate (TDI), diphenyl-methane diisocyanate (MDI), polymethylene polyphenyl polyisocyanate (polymeric MDI), xylylene diisocyanate, 1,5-naphthalene diisocyanate, triphenylmethane triisocyanate, and tolylene diisocyanate.

The molar ratio of the total number of isocyanate groups added with the polyisocyanate compound to hydroxyl groups present in the polymer mixture is between 0.4 to 1.2:1, preferably from 0.6 to 1.1:1.

The reaction of polyisocyanate compound and the polymer mixture may be carried out in the absence or in the presence of solvents which are inert to isocyanate groups. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

Preferably the reaction is conducted in the melt, without the addition of an additional solvent.

The reaction may be carried out by introducing the polyfunctional isocyanate into the polymer mixture at a constant rate at a temperature from 100 to 180° C. while being dispersed and admixed. Preferably the addition of the polyfunctional isocyanate to the polymer mixture is carried out in an extruder, in particularly in a twin-screw extruding machine. Furthermore, a known catalyst such as tin octanoate, tin oleate, dibutyltin dilaurate or the like can be used to catalyze the urethanization reaction.

The urethane modified resin according to the invention can be used as an ingredient for the production of a toner for electronic copying purposes.

The toner is typically obtained by compounding the urethane modified resin with one or more ingredients such as colorant, wax, wax dispersant, charge-controlling agent, magnetic materials and additional binder resins.

Although coloring is optional, normally a colorant is included and can be any of the materials mentioned in Colour Index, Volumes I and II, Second Edition, which is hereby included by reference. Preferably the coloring agent is carbon black.

The toner preferably includes the colorant in an amount of from 1 to 15% by weight, and more preferably from 3 to 10% by weight based on the weight of the toner. When the amount is too small, coloring power of the resultant toner may deteriorate. When the amount is too large, the colorant may not be well dispersed in the resultant toner, resulting in deterioration of coloring power and electric properties of the resultant toner.

Additional binder resins which may be present in toner in addition to the urethane modified resin of the present invention include vinyl polymers, such as homopolymers and copolymers of styrene. Styrene polymers include those containing 40 to 100 percent by weight of styrene, or styrene homologs, and from 0 to 40 percent by weight of one or more lower alkyl acrylates or methacrylates. Styrene polymers include styrene, alpha-methylstyrene, para-chlorostyrene, and vinyl toluene; and alkyl acrylates or methylacrylates or monocarboxylic acids having a double bond selected from acrylic acid, methyl acrylate, 2-ethylhexyl acrylate, 2-ethylhexyl methacrylate, ethyl acrylate, butyl acrylate, dodecyl acrylate, octyl acrylate, phenylacrylate, methylacrylic acid, ethyl methacrylate, butyl methacrylate and octyl methacrylate and are also useful binders. The binder may also be a non-vinyl-type resins such as phenol-formaldehyde resin, epoxy resin, which is generally derived from a bisphenol, such as bisphenol A, and epichlorohydrin, polyurethane resin, cellulose resin and polyether resin.

The ratio of urethane modified resin according to the invention and other binder resin is usually in the range of 1:0 to 1:10 by weight, preferably in the range of 1:0 to 2:1, especially in the range of 1:0 to 5:1.

Other ingredients which may be present in the toner also include polyolefin waxes. As the polyolefin wax to be dispersed in the binder resin there may be preferably used a low molecular weight polyethylene or low molecular weight polypropylene having a softening point of from 80° C. to 160° C. and a number average molecular weight (Mn) of from about 1,000 to about 10,000.

The amount of wax present in the toner is usually from about 0.1 to about 10 weight percent and more preferably from about 1 to about 6 weight percent based on the weight of the toner.

The toner may also include a wax dispersant, such as ethylene vinyl acetate (EVA).

Another optional additive for the toner is a charge control agent. The term "charge-control" refers to a toner additive which modifies the triboelectric charging properties of the resulting toner. A very wide variety of charge control agents for positive and negative charging toners are available. Suitable charge control agents are disclosed, for example, in U.S. Pat. Nos. 3,893,935; 4, 079,014; 4,323,634; 4,394,430 and British Patent Nos. 1,501,065; and 1,420,839. Mixtures of charge control agents can also be used. Particular examples of charge control agents include chromium salicylate organo-complex salts, and azo-iron complex-salts, metal salts of benzoic acid, metal salts of salicylic acid, metal salts of alkylsalicylic acid, metal salts of catechol, metal-containing bisazo dyes, tetraphenyl borate derivatives, quaternary ammonium salts, and alkylpyridinium salts. These compounds are commonly used for making powder toner.

The toner preferably includes the charge controlling agent in an amount of from 0.1 to 10% by weight, and preferably from 0.2 to 5% by weight of the binder (urethane modified resin and other binder resin). When the amount is too small, charge of the resultant toner may be uncontrollable. When the amount is too large, the toner has too large a charge quantity, thereby increasing electrostatic attracting force between a developing roller. Consequently, fluidity of the resultant toner and image density of the resultant image may deteriorate.

The toner may also include magnetic materials. Examples of useful magnetic materials include mixed oxides of iron, iron silicon alloys, iron aluminum, iron aluminum silicon, nickel iron molybdenum, chromium iron, iron nickel copper, iron cobalt, oxides of iron and magnetite. The size of the magnetic carrier particles useful in the present invention can vary widely, and preferably have an average particle size of less than 100 μm, and more preferably have an average carrier particle size of from about 5 to about 45 μm.

The toner generally comprises, based on the weight of the toner, 30 to 60% resin (urethane modified resin and other binder resin); 30 to 50% magnetic material; optionally 1 to 20% of other ingredients, such as colorant, wax, wax dispersant and charge controlling agent.

The toner can optionally obtain a fluidizing agent for enhancing the fluidity of the toner. Available for use as a fluidizing agent which is to be externally admixed with toner particles are inorganic particulate materials, such as silica, alumina, and titania. The fluidizing agent can be hydrophobically treated with a hydrophobicity imparting agent, such as silane coupling agent, titanate coupling agent, aluminum coupling agent, and silicone oil. The amount of fluidizing agent is usually in the range of 0.1 to 1 percent by weight based on the weight of the toner.

The toner of the present invention is obtainable by any known methods such as compounding the urethane modified resin according to any of claims 6 to 8 with one or more of the above mentioned ingredients and pulverizing the bulk material so obtained.

The most general method for obtaining a toner for electrophotographic purposes involves, for example, pulverizing the above-mentioned urethane modified resin to a particle size of some 0.5 to 5 mm, adding other additives, such as colorant, polyolefin wax and charge-controlling agent and other binder resins, mixing the ingredients, for example with a Henshall mixer, and then melt milling the mixture at a temperature of from 100 to 150° C. in a kneader or the like, pulverizing and grading the bulk material so obtained. The toner particles preferably have a particle size from 5 to 15 μm.

The toner of the present invention can be used for the production of a developer for electronic copying purposes.

The developer may be either a one-component developer consisting essentially of the toner or a two-component developer including the toner and a carrier.

The developer of the present invention preferably includes a carrier in an amount of from 90 to 98% by weight, and more preferably from 93 to 97% by weight.

The carrier preferably includes a core and optionally a resin layer covering the core.

Specific preferred examples of usable materials for the core include, but are not limited to, manganese-strontium, manganese-magnesium materials, copper-zinc and iron powders.

The core preferably has an average particle diameter of from 10 to 150 μm.

Specific preferred examples of usable resins for the resin layer include, but are not limited to, amino resins, polyvinyl resins, polystyrene resins, halogenated olefin resins, polyester resins, polycarbonate resins, polyethylene resins, polyvinyl chloride resins, polyvinylidene chloride resins, polytrifluoroethylene resins, polyhexafluoropropylene resins, copolymers of vinylidene fluoride and an acrylic monomer, copolymers of vinylidene fluoride and vinyl fluoride, terpolymers of tetrafluoroethylene, vinylidene fluoride, and a non-fluorinated monomer, and silicone resins. These resins can be used alone or in combination.

The resin layer may include a conductive power, if desired. Specific examples of usable conductive powers include, but are not limited to, metal powders, carbon black, titanium oxide, tin oxide, and zinc oxide. The conductive power preferably has an average particle diameter of 1 μm. or less.

The resin layer can be formed by, for example, dissolving a silicone resin, etc., in an organic solvent to prepare a cover layer coating liquid, and evenly applying the cover layer coating liquid on the core by known methods such as a dip coating method, a spray coating method, and a brush coating method. The coated core is then subjected to drying and baking. Specific examples of the organic solvents include, but are not limited to, toluene, xylene, methyl ethyl ketone, methyl isobutyl ketone, and cellosolve butyl acetate. The baking method can be either or both of an external heating method or an internal heating method. Specific baking methods include methods using a fixed electric furnace, a portable electric furnace, a rotary electric furnace, a burner furnace, and a microwave, but are not limited thereto.

The carrier preferably includes the cover layer in an amount of from 0.01 to 5.0% by weight.

The developer of the present invention is applicable for electronic copying purposes.

During electronic copying, an electric or magnetic latent image is generally formed into a visible image by a developer comprising a toner. Specifically, in electrophotography, an electrostatic latent image is formed on a photoreceptor, and then developed with a developer to form a toner image. The toner image is transferred onto a recording medium such as paper, and fixed thereon by application of heat, etc.

The urethane modified resin produced by the reaction of the polyisocyanate compound and the polymer mixture comprising the polyester of the present invention and a polycondensed resin has several advantages compared to conventional binder resins for toners and developers. The urethane modified resin according to the invention imparts excellent storage stability, improved toughness and reduced brittleness when used for the production of a toner. The urethane modified resin also imparts a high offset resistance preventing the occurrence of so-called off-set such as contamination of the fixing rollers due to partial sticking of a molten toner to the heating rollers.

In addition the urethane modified filler retains a low viscosity, mixes well with other filler ingredients which are used for toner purposes, and melts with a small quantity of heat resulting in an excellent low temperature fixing properties allowing high speed copying and preventing the toner image from being defectively fixed on paper when the fixing temperature is low.

Therefore the urethane modified resin of the present invention enables the resolution of conflicting effects, namely the improvement of storage stability and the offset properties while at the same time improving the low temperature fixing properties.

Toners and developers, in which the urethane modified resin according to the invention is used as an ingredient show especially good properties in respect to the low heat value of the toner and therefore enable high speed copying.

The invention is described by means of illustrative examples below, but the invention is not limited by these illustrative examples.

EXAMPLES

In the following examples "parts" signifies parts by mass and "%" signifies mass %.

Glass Transition Point:

The glass transition point was measured using a differential scanning calorimeter (DSC210, produced by the Seiko Denshi Kogyo Co.) with a temperature raising rate of 10° C./min. Prior to the measurement run the sample is heated well above the glass transition point and cooled down to well below the glass transition point at a cooling rate of 10° C./min.

Hydroxyl Group Value:

The hydroxyl group value was measured on the basis of the method of JIS K 0070.

Number Average Molecular Weight:

The number averaged molecular weight was measure with the GPC method using standard polystyrene calculation.

Example 1

Production of Polycarbonate A-1

Diethyl carbonate (472 parts), 354 parts of 1,6-hexanediol and 0.1 part of tetrabutyl titanate as reaction catalyst were introduced under a nitrogen atmosphere. The temperature was raised from 100° C. to 180° C. over a period of 6 hours at normal pressure. 300 parts of p-t-butylphenol were added at this temperature and reaction was carried out for 3 hours at 180° C. and then by heating to 200° C. over a further period of 3 hours. After this the unreacted diethyl carbonate etc. was distilled off under reduced pressure and the polycarbonate A-1 was obtained. The glass transition point of this resin was 53° C., the hydroxyl group value was 8 mg KOH/g and the number average molecular weight was about 800 g/mol.

Example 2

Production of Polycarbonate A-2

Ethylene carbonate (molecular weight 88.1) (880 parts), 1170 parts of 1,4 butanediol and 0.22 part of tetrabutyl titanate as reaction catalyst were introduced under a nitrogen atmosphere. The temperature was raised from 100° C. to 170° C. over a period of 6 hours at normal pressure. 108 parts of p-t-butylphenol (molecular weight 150) were added at this temperature and reaction was carried out for 3 hours at 170° C. and then by heating to 190° C. for a further period of 3 hours. After this the unreacted ethylene carbonate etc. was distilled off and the polycarbonate A-2 was obtained. The glass transition point of this resin was 45° C., the hydroxyl group value was 6 mg KOH/g and the number average molecular weight was about 2000 g/mol.

Example 3

Production of Polycondensed Resin B-1

Diethyl carbonate (molecular weight 118) (389 parts), 472 parts of 1,6 hexanediol (molecular weight 118) and 0.09 part of tetrabutyl titanate as reaction catalyst were introduced introduced under a nitrogen atmosphere. The temperature was raised from 100° C. to 180° C. over a period of 3 hours at normal pressure and reaction was carried out for 3 hours at 180° C. and then by heating to 200° C. over a further period of 3 hours. After this the unreacted material was distilled off under reduced pressure and the polycarbonate B-1 was obtained. The glass transition point of this resin was 53° C., the hydroxyl group value was 58 mg KOH/g and the number average molecular weight was about 1900 g/mol.

Example 4

Production of Polycondensed Resin B-2

Ethylene carbonate (molecular weight 88.1) (880 parts), 1080 parts of 1,4 butanediol and 0.2 part of tetrabutyl titanate as reaction catalyst were introduced under a nitrogen atmosphere. The temperature was raised from 100° C. to 170° C. over a period of 6 hours at normal pressure and reaction was carried out for 3 hours at 170° C. and then by heating to 190° C. over a further period of 3 hours. After this the unreacted ethylene carbonate etc. was distilled off and the polycarbonate B-2 was obtained. The glass transition point of this resin was 43° C., the hydroxyl group value was 56 mg KOH/g and the number average molecular weight was about 2000 g/mol.

Example 5

Production of Urethane Modified Resin from A-1 and B-1

Polycarbonate (A-1) (60 parts) and 40 parts of polycarbonate resin (B-1) were mixed in a biaxial mixer. 4.4 parts of tolylene diisocyanate (1 NCO group equivalent per 1 OH group equivalent) were added to the polymer mixture over a period of 2 hours using an extruder. The material obtained was cooled and coarse pulverized to a particle size of from 0.5 to 20 mm using a coarse pulverizing machine.

Example 6

Production of Urethane Modified Resin from A-1 and B-2

Polycarbonate (A-1) (60 parts) and 40 parts of polycarbonate resin (B-2) were mixed in a biaxial mixer. 4.2 parts of tolylene diisocyanate (1 NCO group equivalent per 1 OH group equivalent) were supplied to the polymer mixture over a period of 2 hours using an extruder. The material obtained was cooled and coarse pulverized to a particle size of from 0.5 to 20 mm using a coarse pulverizing machine.

Example 7

Production of Urethane Modified Resin from A-2 and B-2

Polycarbonate (A-2) (50 parts) and 50 parts of polycarbonate resin (B-2) were mixed in a biaxial mixer. 4.8 parts of tolylene diisocyanate (1 NCO group equivalent per 1 OH group equivalent) were supplied to the polymer mixture over a period of 2 hours using an extruder. The material obtained was cooled and coarse pulverized to a particle size from 0.5 to 20 mm using a coarse pulverizing machine.

Example 8 (Comparative Example)

Production of Urethane Modified Resin

A polyester resin C-1 which had a glass transition point of 53° C., a hydroxyl group value of 8 mg KOH/g and a number average molecular weight of about 800 g/mol was obtained by means of the normal melt-polycondensation method using 472 parts of oxalic acid dimethyl ester, 354 parts of 1,6-hexandiol and 544 parts of methyl benzoate.

Moreover, the polyester resin C-2 which had a glass transition point of 48° C., a hydroxyl group value of 56 mg KOH/g and a number average molecular weight of about 2000 was obtained in the same way using 354 parts of oxalic acid dimethyl ester and 389 parts of 1,6-hexandiol.

The polyester resin C-1 (60 parts) and 40 parts of the polyester resin C-2 were mixed. 4.2 parts of tolylene diisocyanate (1 NCO group equivalent per 1 OH group equivalent) were supplied to the polymer mixture over a period of 2 hours in an extruder. The material obtained was cooled and coarse pulverized to a particle size of from 0.5 to 20 mm using a coarse pulverizing machine.

Example 9

Evaluation of Toner Compositions for Electrophotographic Purposes 6 parts of Carbon black, 1 part of charge controlling agent and 1.5 parts of polypropylene wax were compounded with 100 parts of urethane modified resins obtained in Examples 5 to 7 and Example 8 (comparative example) and dispersed and mixed in a Henshall mixer and subsequently milled with a biaxial mixer. A bulk-like toner compositions were obtained.

After coarsely pulverizing these compositions they were finely pulverized in a fine pulverization machine (1-type mill, produced by the Nippon Pneumatic Co.) and then graded. Toner particles of average particle size of about 8 μm were obtained. A fluidizing agent (Nippon Aerosil R972) (0.5 percent by weight) was added to the toner particles and toners were obtained. Ferrite carrier (F150, produced by Nippon Teppun) (96 parts) was added to 4 parts of the toner to make a developer.

Low Temperature Fixing Properties:

A toner image was transferred onto paper using a commercial copier (DC1257, produced by Sanda Kogyo) and fixing tests were carried out with modification of the fixing part of a commercial copier (SF8400A, produced by Sharp Co.) with the toner on the paper onto which it had been had transferred. The tests were carried out with the speed of the hot roll set to 190 mm/sec. The lower limit temperature at which it was fixed with no low temperature offset was taken as the fixing temperature Storage Properties:

Toner (4 g) was left to stand for 72 hours in an environment having a temperature 55° C. and a humidity of 60%. After standing, the extent to which toner aggregation had occurred was observed visually and the storage properties were evaluated on the basis of the evaluation criteria indicated below.

Evaluation Criteria:

4: No aggregation was seen at all after 48 hours or even after 72 hours

3: No aggregation was seen after 48 hours but slight aggregation was seen after 72 hours 2: No aggregation was seen after 48 hours but clear aggregation was seen after 72 hours 1: Aggregation was seen already within 48 hours.

The abovementioned results are shown in the table.

| | Low Temperature Fixing Properties | Storage Properties |
|---|---|---|
| Example 5 | 125° C. | 4 |
| Example 6 | 125° C. | 4 |
| Example 7 | 125° C. | 4 |
| Example 8 (Comparative Example) | 130° C. | 2 |

The invention claimed is:

1. A polycarbonate, having:

a number average molecular weight of from 500 to 10000, a glass transition point of from 30 to 80° C., and a hydroxyl group value of 10 mg KOH/g or less.

2. The polycarbonate of claim 1, wherein the glass transition point is from 40 to 70° C.

3. The polycarbonate of claim 1, obtained by a process comprising reacting a polyhydric alcohol, a carbonate component, and a blocking agent.

4. The polycarbonate of claim 3, wherein the polyhydric alcohol is at least one alcohol selected from the group consisting of 1,4-butanediol, 1,6-hexanediol, bisphenol A ethylene oxide adduct, and bisphenol A propylene oxide adduct, the carbonate component is at least one component selected from the group consisting of ethylene carbonate, propylene carbonate, dimethyl carbonate, diethyl carbonate, dibutyl carbonate, and methyl ethyl carbonate, and the blocking agent is at least one agent selected from the group consisting of 1-hexanol, 1-pentanol, 1-octanol, cyclohexanol, cyclopentanol, cyclooctanol, methacrylol, 3,5-xylenol, p-t-butylphenol.

5. A urethane modified resin obtained by a process comprising reacting a polymer mixture, comprising the polycarbonate of claim 1 and a polycondensed resin, with a polyfunctional isocyanate compound, wherein a ratio of the polycarbonate to the polycondensed resin is from 20:80 to 80:20 by weight, a molar ratio of isocyanate groups in the polyfunctional isocyanate compound to hydroxyl groups in the polymer mixture is from 0.4 to 1.2:1, a glass transition point of the polycondensed resin is from 10 to 60° C., and a hydroxyl group value of the polycondensed resin is from 20 to 100 mg KOH/g.

6. The urethane modified resin of claim 5, wherein the polycondensed resin is a polyester resin, a polycarbonate resin, or a polyester/polycarbonate co-condensed resin.

7. The urethane modified resin of claim 6, wherein the polycondensed resin is a polycarbonate resin made from a carbonate compound and a polyhydric compound, the carbonate compound is at least one compound selected from the group consisting of ethylene carbonate, propylene carbonate, dimethyl carbonate, diethyl carbonate, dibutyl carbonate, and methyl ethyl carbonate, and the polyhydric compound is at least one compound selected from the group consisting of 1,4-butanediol, 1,6-hexanediol, bisphenol A ethylene oxide adduct, and bisphenol A propylene oxide adduct.

8. A toner, comprising the urethane modified resin of claim 5.

9. A developer, comprising the toner of claim 8.

10. A method for producing a urethane modified polycarbonate based resin, comprising:

reacting a polymer mixture, comprising the polycarbonate of claim 1 and a polycondensed resin, with a polyfunctional isocyanate compound wherein a ratio of polycarbonate to polycondensed resin is from 20:80 to 80:20 by weight, a molar ratio of isocyanate groups in the polyfunctional isocyanate compound to hydroxyl groups in the polymer mixture is from 0.4 to 1.2:1, a glass transition point of the polycondensed resin is from 10 to 60° C., and a hydroxyl group value of the polycondensed resin from 20 to 100 mg KOH/g.

11. A method for producing a toner, comprising:

compounding the urethane modified resin of claim 5 with at least one other ingredient selected from the group consisting of a colorant, a binder resin, a wax, a wax dispersant, a fluidizing agent, a magnetic material, and a charge control agent, to obtain a bulk material, and pulverizing the bulk material.

12. A method for producing a developer, comprising:

compounding the toner of claim 8 with a carrier.

13. An image forming method, comprising:

forming an electrostatic latent image on an electrostatic latent image bearing member, and developing the electrostatic latent image with the developer of claim 9.

14. The developer of claim 9, further comprising a carrier.

15. An image forming method, comprising:

forming an electrostatic latent image on an electrostatic latent image bearing member, and developing the electrostatic latent image with the toner of claim 8.

16. An image forming method, comprising:

forming an electrostatic latent image on an electrostatic latent image bearing member, and developing the electrostatic latent image with the urethane modified resin of claim 5.

17. A method for producing the polycarbonate of claim 1, comprising reacting a polyhydric alcohol, a carbonate component, and a blocking agent.

18. The method of claim 17, wherein reacting the polyhydric alcohol, the carbonate component, and the blocking agent is in the presence of a catalyst.

19. The method of claim 18, wherein the catalyst is a carbonate; a carboxylate; a borate; a silicate; a carbonate; an oxide; an organometallic compound of an alkali metal, an alkaline earth metal, zinc, titanium, or lead; or a combination thereof.

20. The method of claim 17, wherein a temperature of reacting the polyhydric alcohol, the carbonate component, and the blocking agent is from 70 to 250° C.

* * * * *